(12) United States Patent
Yandle et al.

(10) Patent No.: US 8,820,353 B2
(45) Date of Patent: Sep. 2, 2014

(54) INTERFACE ASSEMBLY FOR SPACE VEHICLES

(75) Inventors: Tom Yandle, Palmetto, FL (US); David Fordham, Seminole, FL (US)

(73) Assignee: Carleton Technologies, Inc., Orchard Park, NY (US)

(*) Notice: Subject to any disclaimer, the term of this patent is extended or adjusted under 35 U.S.C. 154(b) by 616 days.

(21) Appl. No.: 13/171,808

(22) Filed: Jun. 29, 2011

(65) Prior Publication Data

US 2012/0000575 A1 Jan. 5, 2012

Related U.S. Application Data

(60) Provisional application No. 61/360,237, filed on Jun. 30, 2010.

(51) Int. Cl.
| F16L 37/32 | (2006.01) |
| B64D 37/02 | (2006.01) |
| B64G 1/00 | (2006.01) |
| B64G 1/64 | (2006.01) |
| F16L 37/35 | (2006.01) |
| B64G 1/42 | (2006.01) |
| B64G 1/10 | (2006.01) |
| B64G 1/40 | (2006.01) |

(52) U.S. Cl.
CPC .......... *F16L 37/35* (2013.01); *B64G 1/428* (2013.01); *B64G 1/646* (2013.01); *B64G 1/1078* (2013.01); *B64G 1/402* (2013.01)
USPC .......... 137/614.04; 244/135 R; 244/172.2; 244/172.4

(58) Field of Classification Search
USPC .......... 137/614, 614.01–614.05, 572, 637.05; 244/172.2, 172.3, 172.4, 135 R, 135 A; 439/191, 194
See application file for complete search history.

(56) References Cited

U.S. PATENT DOCUMENTS

| 2,924,464 | A | * | 2/1960 | Zajac et al. .................... 280/421 |
| 3,491,326 | A | * | 1/1970 | Pfister et al. .................. 439/141 |
| 4,700,743 | A | | 10/1987 | L'Henaff |
| 6,299,107 | B1 | | 10/2001 | Kong et al. |
| 6,325,100 | B1 | * | 12/2001 | Bunschoten et al. .... 137/614.04 |
| 7,104,505 | B2 | | 9/2006 | Tchoryk |
| 7,694,692 | B2 | | 4/2010 | Hansson |
| 2008/0216907 | A1 | | 9/2008 | Smith |
| 2008/0237400 | A1 | * | 10/2008 | Gryniewski et al. ....... 244/172.2 |

* cited by examiner

*Primary Examiner* — Craig Schneider
*Assistant Examiner* — Michael R Reid
(74) *Attorney, Agent, or Firm* — Jaeckle Fleischmann & Mugel, LLP

(57) ABSTRACT

Disclosed is a multipart valve assembly. The assembly can be used in selectively coupling two vehicles. The assembly includes inter-fitting male and female components and associated control valves. Coupling the male and female components establishes media (fluid or gas), communications, and electrical paths between space vehicles. This permits the passage of media from one vehicle to the other and likewise enables one vehicle to operate the control valve of the other vehicle.

11 Claims, 3 Drawing Sheets

US 8,820,353 B2

INTERFACE ASSEMBLY FOR SPACE VEHICLES

CROSS-REFERENCE TO RELATED APPLICATIONS

This application claims priority to Provisional Application No. 61/360,237 filed on Jun. 30, 2010 and titled "Interface Assembly For Selectively Providing Fluid, Power, Electrical Data And Other Media And Modular Component Parts For Space Based Systems." The contents of the above application are fully incorporated herein for all purposes.

BACKGROUND OF THE INVENTION

1. Field of the Invention

The invention relates to an interface assembly for establishing a fluid, electrical and/or communications path between two or more space vehicles.

2. Description of the Background Art

Satellite refueling systems are known in the art. These systems generally comprise dispensing (or host) and receiving (or client) satellites that are temporarily interconnected for the purpose of transferring propellant, pressurant, or other media. The interconnection can be accomplished, for example, by a refueling arm or umbilical that is extended from the host satellite to the client satellite. Refueling satellites are advantageous because it greatly extends the operating life of existing satellites. The costs associated with refueling are generally far less than abandoning existing satellites and launching replacement satellites. This is especially true where the satellite to be refueled carries complex, sensitive and/or expensive equipment.

Refueling is also necessary for reconnaissance satellites. Reconnaissance satellites are increasingly involved in sensitive or classified surveillance operations. National security needs dictate that such surveillance be uninterrupted. Uninterrupted surveillance is accomplished by refueling the satellite while on-orbit.

All of the foregoing refueling operations must be carried out in the hostile environment of space. Further complexity is encountered because satellites are remotely operated from earth based ground stations. The receiving and dispensing satellites must rendezvous and be properly interconnected before fuel can be transferred. The interconnection must be exact to avoid fuel leaks. Fuel leaks are especially problematic in space as they cause unintended thrust resulting in unwanted vehicle movement and possible loss of orbit. Fuel leaks can also result in combustion of the propellant and potential damage or loss of one or both satellites.

There is also a need in the art for interface systems that facilitate an electrical coupling between two spacecraft. Such an electrical coupling could permit batteries within one vehicle to be recharged by the other vehicle. Such a coupling could also allow for the permanent, or temporary, attachment of external hardware to supplement or replace failed on-board systems. Other failed systems being supplemented or replaced could include rechargeable power cells, computer systems, memory modules, fuel cells, or pressurized propulsion modules. Data can also be passed between the satellites to permit operational software within the one of the satellites to be updated and/or modified. Since this is a hard connection (as opposed to wireless), data cannot be jammed. Future embodiments of the connection could have an optic fiber link for non powered communications.

Thus, there exists a need in the art for an interface assembly that permits the safe and effective refueling of space vehicles. There also exists a need in the art for an interface assembly that allow for the simultaneous transfer of fuel (to include xenon and other gasses for ion drive engines), data, and electricity. The interface assembly of the present invention is aimed at fulfilling these and other needs.

SUMMARY OF THE INVENTION

An advantage of the present interface assembly is that it permits the transfer of propellant between space vehicles while eliminating or minimizing propellant leakage.

Another advantage of the present interface assembly is that is creates separate fluid and electrical pathways between the host and client vehicles.

Yet another advantage of the present interface assembly is that is permits the simultaneous transfer of propellant, data, and electricity between two space vehicles.

Still yet another advantage is realized by providing a releasable and re-sealable fluid connection between two satellites.

Another advantage is achieved by providing electrical connectors that are protected from contamination when not in use.

The foregoing has outlined some of the pertinent advantages of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

PARTS LIST

20 Host Spacecraft
22 Client Spacecraft
24 Host Tank
26 Fluid Pathway (Host Spacecraft)
28 Linear Control Valve (Host Spacecraft)
32 Male Valve Assembly
34 Valve Needle
36 Opening in Valve Needle
38 Inner Housing (Male Valve)
42 Spring in Inner Housing
44 Seal for Inner Housing
46 Outer Housing (Male Valve)
48 Electrical Contacts in Outer Housing
52 Conical Opening -continued

PARTS LIST

54 Receptacle
56 Female Valve Assembly
58 Inner Housing (Female Valve)
62 Opening in Inner Housing
64 Valve Cap in Inner Housing
66 Valve Seal in Inner Housing
68 Valve Spring in Inner Housing
72 Fluid pathway through Inner Housing
74 Outer Housing (Female Valve)
76 Sheath over Outer Housing
78 Spring for Sheath
82 Electrical Contacts in Outer Housing
84 Fluid Pathway (client Spacecraft)
86 Linear Control Valve (Client Spacecraft)
88 Client Tank

DETAILED DESCRIPTION OF THE PREFERRED EMBODIMENTS

The present invention relates to a multipart valve assembly. The assembly can be used in selectively coupling two vehicles. The assembly includes inter-fitting male and female components and associated control valves. Coupling the male and female components establishes fluid, gas, communications, and electrical (and future optical) paths between the vehicles. This permits the passage of media from one vehicle to the other and likewise enables the host vehicle to operate the control valve of the client vehicle.

In this particular but non-limiting example, the valve assembly is used in connection with satellite refueling. Here, one satellite acts as the host spacecraft 20 holding a supply of fuel such as hydrazine or Xenon gas. A client spacecraft 22 is temporarily coupled to the host spacecraft 20 for the transfer of fuel. Although this embodiment is described in connection with the transfer of fuel, other media such as pressurants (nitrogen), or refrigerants, or electrical power could likewise be transferred. In other embodiments, hardware could simply left attached to the client via the valve assembly and left behind to permanently support the client.

Figure 1:
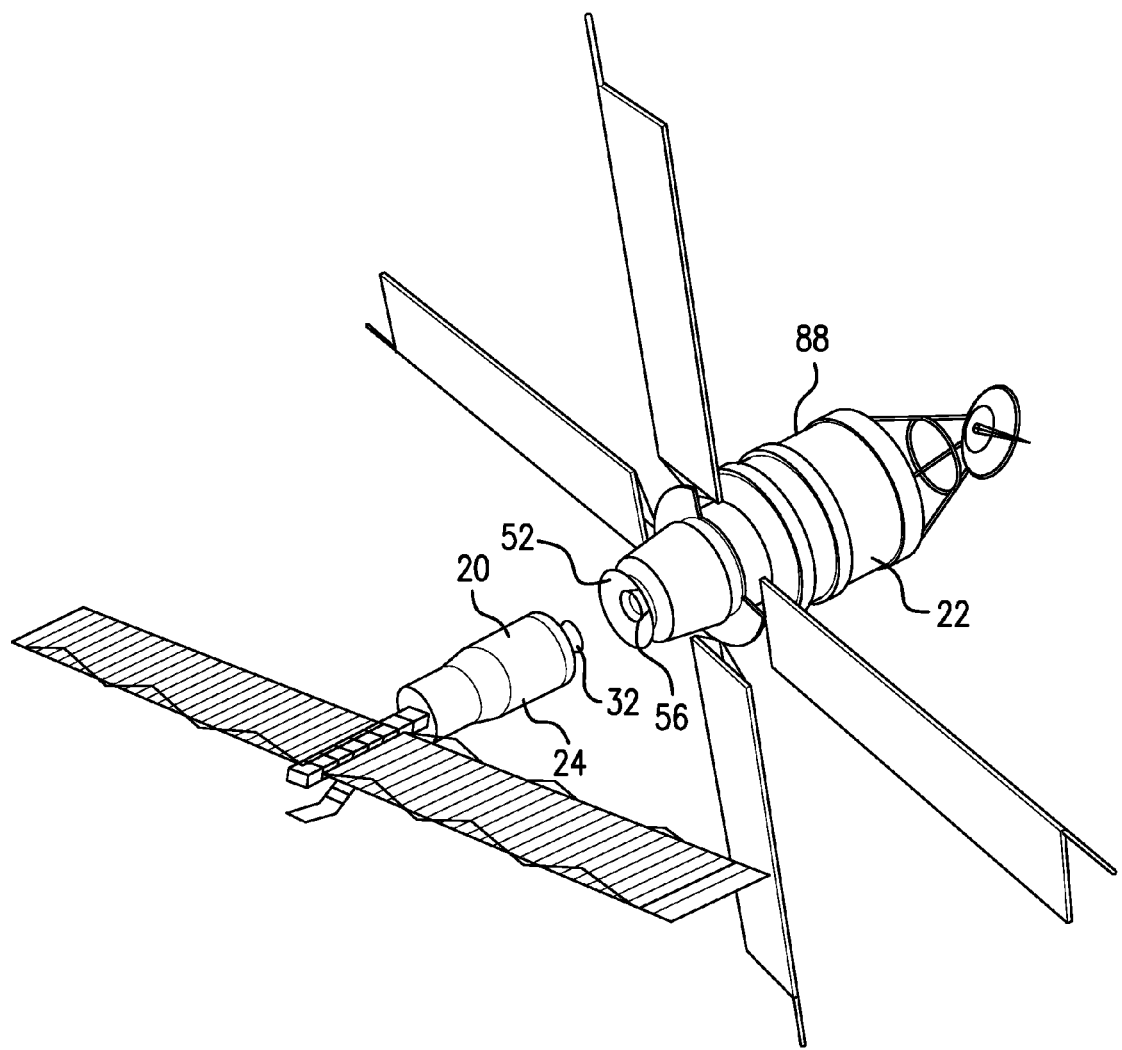
FIG. 1 illustrates the source and receiving spacecraft that can be used in connection with one possible embodiment of the present invention.
Figure 2:
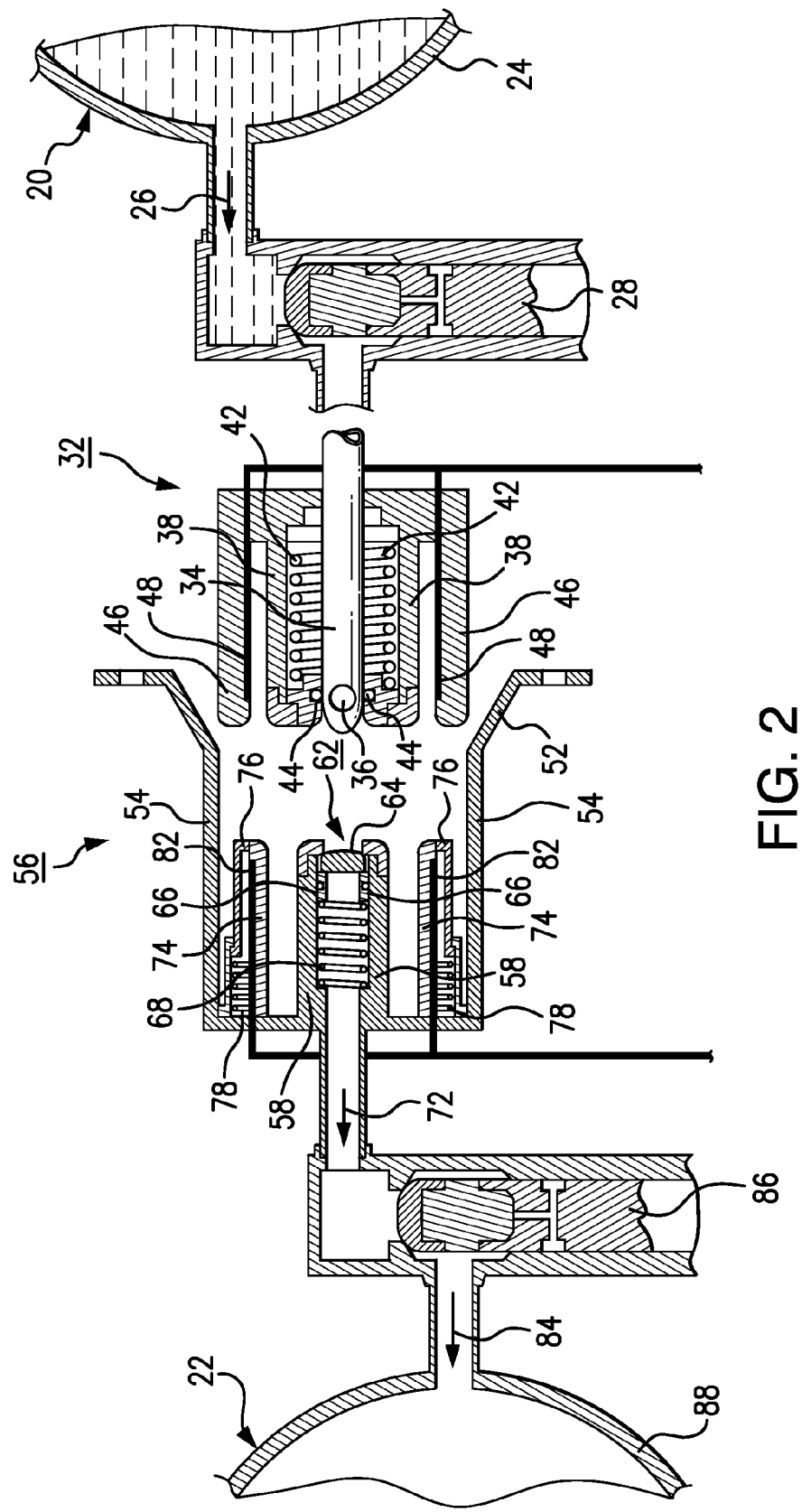
FIG. 2 is a cross sectional view of the interface assembly in the disengaged orientation.
Figure 3:
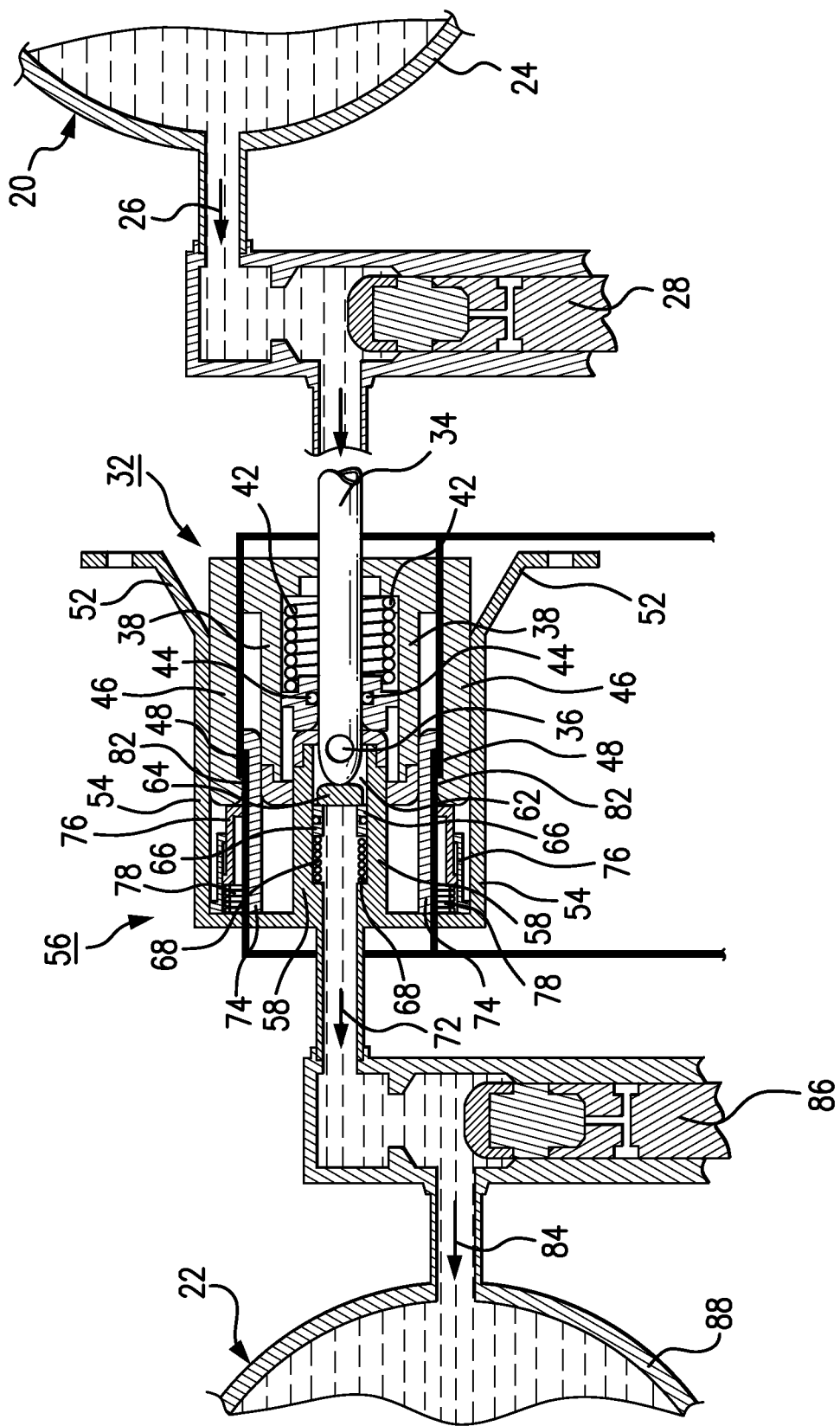
FIG. 3 is a cross sectional view of the interface assembly in the engaged orientation.

The valve assembly is illustrated in the cross sectional view of FIG. 3. The right side of the figure corresponds to the portion of the assembly associated with the host spacecraft 20 and the left side corresponds to the portion of the assembly associated with the client spacecraft 22. The media to be transferred is initially stored in a tank 24 on-board the host vehicle 20. A fluid path 26 connects tank 24 to a male valve assembly 32 via a Linear Control Valve (LCV) 28. One suitable control valve is the non-magnetic latching servo actuated valve disclosed in U.S. Pat. No. 7,694,692 and assigned to Conax Florida Corporation.

Male valve assembly 32 includes a centrally located valve needle 34. In one embodiment, valve assembly 32 is cylindrical. A hollow valve needle 34 is used in opening a fluid path between the two valve components. Needle 34 includes an opening 36 at its distal end to allow for the passage of media. Valve needle 34 sits within an inner housing 38 and is biased to a retracted position relative to the housing 38 via a coil spring 42. A fluid tight seal is maintained between needle 34 and inner housing 38 via sealing ring 44.

Male valve assembly 32 further includes an outer housing 46 that preferably takes the form of a ring. A series of discrete electrical contacts 48 are spaced along the interior surface of housing 46. These contacts are, in turn, coupled to a power source and microprocessor on-board the host spacecraft 20.

The client spacecraft 22 includes a conical opening 52 and a receptacle 54 for use in receiving and properly aligning male valve assembly 32. A female valve assembly 56 sits within the base of receptacle 54. Female assembly 56 is preferably cylindrical and includes an inner cylindrical housing 58 with a centrally located opening 62. A valve cap 64 serves to open and close opening 62 against the bias of spring 68. A seal 66 is used in forming a media tight seal between valve cap 64 and opening 62 when cap 64 is closed. When cap 64 is opened, a fluid path 72 is established around the periphery of cap 64.

Female assembly 56 includes an outer housing 74 which takes the form of a ring with a diameter that is slightly smaller than the diameter of housing 46. A sheath 76 is slidably positioned over the exterior surface of outer housing 74. A coil spring 78 is used to urge the sheath 76 to its extended position covering housing 74. In the unbiased state, sheath 76 covers and protects a series of discrete electrical contacts 82 that are positioned about the periphery of outer housing 74. Finally, female assembly 56 includes a media pathway 84 that is in communication with the pathway 72. Pathway 84, in turn, is in communication with a receiving tank 88 within the client vehicle 22. Flow into the client vehicle is regulated by a control valve 86. Control valve 86 preferably has a construction that is similar to valve 28.

In operation, the two vehicles 20 and 22 are oriented with respect to one another and male valve assembly 32 is guided into receptacle 54 via conical opening 52. Thereafter, needle 34 engages opening 62 and pushes back valve cap 64 against the bias of spring 68. This establishes a media path extending from source tank 24 to receiving tank 88 via needle opening 36. However, communications and power can also be delivered to client vehicle 22 via contacts 48 and 82. As male valve assembly 32 engages female valve assembly 56, outer housing 46 engages sheath 76 and pushes it back against bias of spring 78. Thereafter, contacts 48 are brought into registry with contacts 82. This establishes an electrical connection whereby the host vehicle 20 can power the client vehicle 22. Additionally, the host vehicle 20 gains complete operational control of control valve 86 via a communications link established via contacts 48 and 82.

The present invention has been described in connection with space based vehicles. In this context, the preferred structural materials are stainless steel and/or titanium. Moreover, for the sealing components, the preferred material is PEEK (PolyEtherEtherKetone). Furthermore, although disclosed in connection with spaced based vehicles, the present invention can also be used in coupling land or sea based vehicles.

Disclosed is a system that would allow one space vehicle to refuel another space vehicle with the use of Linear Control Valves and a Mechanical Interface. The interface allows the transfer of fuel, gases, electrical power, or data, from a host vehicle to a client vehicle. Linear Control Valves located on each vehicle control the media flow. Pressure and other types of monitoring would be used to determine when the receiving vehicle has received the required amount of fluid. Power is only required by the host vehicle to operate the system thereby reducing the refuel complexity.

In one specific embodiment, the system would allow the refueling of previously launched satellites and thus extend their life. This would be accomplished by providing a means to replenish various control/positioning systems with the needed media to continue operations by allowing fuel to be transferred from a re-fueling satellite. By the nature of the interface, only the host spacecraft needs to supply power for this operation thus reducing the complexity of the system on the client spacecraft. Another benefit would be the possibility of launching a satellite with certain media that would not be needed until after a satellite has been launched. This would potentially reduce the mass of the satellite for liftoff and allow less energy required to initially launch the satellite. Another embodiment of the system could permit the transmission of electrical charging of on-board batteries as the interface has multiple electrical contacts to permit such capability. Another embodiment of the system could include the attachment of modular equipment, such as batteries or fuel cells, computing equipment, or other strategic or tactical equipment, which would offer further mission support via the multi-function interface.

In still yet another embodiment, the system is used to off-load fuel and/or hazardous materials from a satellite prior to it being decommissioned or following a mechanical failure. The offloaded fuel/materials could then be safely disposed of or supplied to another active satellite.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

The invention claimed is:

1. An interface system for selectively providing media, fluid or gas, and electrical paths between first and second space vehicles, the interface system comprising:
   a source tank storing propellant or pressurant within the first space vehicle, a first media pathway connected to the source tank, a first linear control valve for selectively permitting the release of the propellant or pressurant through the first media pathway;
   a male valve assembly comprising cylindrically shaped inner and outer housings, each of the housings having an opened forward end, a valve needle positioned within the inner housing, the valve needle and inner housing being in constant axial relation, the valve needle being in media communication with the first media pathway, a valve aperture formed within the valve needle, a seal positioned within the inner housing, the seal having seated and unseated orientations, a spring biasing the seal into the seated orientation, in the seated orientation the seal is positioned within the opened forward end of the inner housing and the valve aperture is unexposed, in the unseated orientation the seal is removed from the opened forward end of the inner housing in a retracted position relative to the valve aperture and the valve aperture is exposed, a series of first electrical contacts positioned about the outer housing;
   a receiving tank within the second space vehicle, a second media pathway connected to the receiving tank, a second linear control valve for selectively controlling media flow between the second media pathway and the receiving tank;
   a female valve assembly comprising a conical receptacle and inner and outer housings, the inner housing being in media communication with the second media pathway, each of the housings having an opened forward end, a valve cap positioned within the inner housing, the valve cap having seated and unseated orientations, a spring biasing the valve cap into the seated orientation, a series of second electrical contacts positioned about the outer housing, a spring biased sheath positioned over the second electrical contacts;
   the interface system having an engaged orientation wherein the inner housing of the female valve assembly engages and displaces the seal of the male valve to expose the valve aperture and the valve needle of the male valve assembly engages and displaces the valve cap of the female valve assembly to form a media path between the valve needle of the male valve assembly and the inner housing of the female valve assembly, the media path being established around the periphery of the valve cap of the female valve assembly, in the engaged orientation the outer housing of the male valve assembly displaces the spring biased sheath of the female valve assembly whereby the first and second electrical contacts are placed into contact and form an electrical path between the male and female valve assemblies.

2. An interface system comprising:
   a male valve assembly comprising inner and outer housings, each of the housings having an opened forward end, a valve needle positioned within the inner housing, the valve needle and inner housing being in constant axial relation, a valve aperture formed within the valve needle, a seal positioned within the inner housing, the seal having seated and unseated orientations, a spring biasing the seal into the seated orientation, in the seated orientation the seal is positioned predominantly within the opened forward end of the inner housing and the valve aperture is unexposed, in the unseated orientation the seal is removed from the opened forward end of the inner housing in a retracted position relative to the valve aperture and the valve aperture is exposed, a series of first electrical contacts positioned about the outer housing; and
   a female valve assembly comprising inner and outer housings, each of the housings having an opened forward end, a valve cap positioned within the inner housing, the valve cap having seated and unseated orientations, a spring biasing the valve cap into the seated orientation, a series of second electrical contacts positioned about the outer housing;
   the interface system having an engaged orientation where the inner housing of the female valve assembly enters the opened forward end of the inner housing of the male valve assembly and engages and displaces the seal of the male valve to expose the valve aperture, and where the valve needle of the male valve assembly engages and displaces the valve cap of the female valve assembly to form a media path between the valve of the male valve assembly and the inner housing of the female valve assembly, the media path being established around the periphery of the valve cap of the female valve assembly.

3. The interface system as described in claim 2 further comprising a sheath positioned over the second electrical contacts.

4. The interface system as described in claim 3 wherein the sheath is spring biased to a closed position over the second electrical contacts.

5. The interface system as described in claim 2 wherein the inner and outer housings of the male and female valve assemblies are cylindrical.

6. The interface system as described in claim 2 further comprising a conical receptacle positioned about the outer housing of the female valve assembly.

7. The interface system as described in claim 4 wherein the interface system has an engaged orientation and wherein in the engaged orientation the outer housing of the male valve assembly displaces the spring biased sheath of the female valve assembly whereby the first and second electrical contacts are placed into contact and form an electrical path between the male and female valve assemblies.

8. The interface system as described in claim 2 further comprising a source tank storing propellant within a first space vehicle, a first media pathway connected to the source tank and the valve needle.

9. The interface system as described in claim 8 further comprising a first linear control valve for selectively permitting the release of the propellant through the first media pathway.

10. The interface system as described in claim 9 further comprising a receiving tank within a second space vehicle, a second media pathway connected to the receiving tank and the inner housing of the female valve assembly.

11. The interface system as described in claim 10 further comprising a second linear control valve for selectively controlling media flow between the second media pathway and the receiving tank.

* * * * *